(12) United States Patent
Duerig et al.

(10) Patent No.: US 7,397,754 B1
(45) Date of Patent: Jul. 8, 2008

(54) MICRO-ELECTROMECHANICAL SYSTEM BASED DATA STORAGE SYSTEM

(75) Inventors: Urs T. Duerig, Rueschlikon (CH); Bernd W. Gotsmann, Horgen (CH); Armin W. Knoll, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/017,791

(22) Filed: Jan. 22, 2008

(51) Int. Cl.
*G11B 9/00* (2006.01)

(52) U.S. Cl. .................................... 369/126

(58) Field of Classification Search ................ 369/126
See application file for complete search history.

(56) References Cited

U.S. PATENT DOCUMENTS

| | | | |
|---|---|---|---|
| 5,615,143 A * | 3/1997 | MacDonald et al. | 365/112 |
| 5,751,683 A | 5/1998 | Kley | |
| 6,229,607 B1 * | 5/2001 | Shirai et al. | 356/614 |
| 6,278,113 B1 * | 8/2001 | Murayama et al. | 250/306 |
| 6,989,493 B2 | 1/2006 | Hipwell, Jr. et al. | |
| 7,186,019 B2 | 3/2007 | Binnig et al. | |
| 7,354,788 B2 * | 4/2008 | Bar-Sadeh et al. | 438/52 |
| 2006/0271733 A1 | 11/2006 | Noble | |
| 2007/0047427 A1 | 3/2007 | Cherubini et al. | |

OTHER PUBLICATIONS

"The Millipede—More than a thousand tips for future AFM data storage", P. Vettiger et al., IBM Journal of Research and Developemnt, vol. 44, No. 3, May 2000, http://www.research.ibm.com/journal/rd/443/vettinger.htm, accessed Jan. 3, 2008.

* cited by examiner

*Primary Examiner*—Thang V Tran
(74) *Attorney, Agent, or Firm*—Cantor Colburn LLP; Martine Toleti

(57) ABSTRACT

A data storage system having a positioning system for a micro-electromechanical system ("MEMS") based data storage provided. The data storage system includes a MEMS-based scanner that interacts with a polymer medium to read, write and erase data. A first positioning system is coupled to the MEMS scanner to allow the storage of data over a defined area. A second positioning system is coupled to the first positioning system and the MEMS scanner to allow the use of a larger polymer medium. A plurality of storage modules is also provided to allow scalability of data storage.

5 Claims, 6 Drawing Sheets

MICRO-ELECTROMECHANICAL SYSTEM BASED DATA STORAGE SYSTEM

BACKGROUND OF THE INVENTION

The present invention relates to a micro-electromechanical system (MEMS) based data storage system, and in particular to MEMS based data storage systems having coarse and fine positioning arrangements.

A MEMS based system can be utilized to generate nanometer-scale motion. Such systems can take advantage of this motion to build the capability of spanning micrometer-scale areas in an x-y plane. An important application of this type of system is in the area of atomic force microscopy ("AFM") storage applications.

In this application, a polymer medium is used for recording information with a MEMS scanner. Typically, the scanner includes an array of MEMS devices that are able to read, write and erase data on the polymer medium. Each of the MEMS devices includes a micrometer scale tip that can be used to scan the surface of the polymer medium. The tip is heated to a specified temperature and force is applied for writing information in the form of indents and the resistance of the electrical heater is measured to read back the data on the polymer medium. Due to their small size of the tip apex, typically 10 nm, the use of the MEMS scanning devices allows a high data storage density to be achieved.

In general, some form of positioning device is needed to ensure proper alignment of the tip with the medium and to allow a single tip to scan over a broader area. However, due to the level of precision needed and the amount of data output required, the amount of area a single MEMS device could write to is relatively limited. Therefore, to increase the capacity, or scale the amount of data stored with such MEMS based systems requires either the increase in size of the array, or the use of multiple arrays. While each of these techniques has allowed the amount of storage to be increased, it has also increased manufacturing costs as well.

While current data storage systems are suitable for their intended purposes, there exists a need for improvements of high capacity data storage system to allow scalability in the amount of data stored and retrieved with MEMS based devices.

BRIEF DESCRIPTION OF THE INVENTION

A micro-electromechanical system (MEMS) based data storage system comprising a storage module is provided. The storage module includes a stationary data storage medium. An array of MEMS cantilever devices is provided where each of the MEMS cantilever devices has an associated tip. The array of MEMS cantilevers devices is arranged adjacent to a data surface. A CMOS device is coupled to the array and has circuits arranged to receive signals from MEMS cantilever devices. A motion generator operable over an area of 100 µm×100 µm is coupled to the CMOS device.

A first guide rail is slidably coupled to the motion generator. A first magnetic actuator is associated with the first guide rail and magnetically coupled to the motion generator. The first guide rail linearly moves the motion generator up to 10 cm in a first direction relative to the data storage medium. A second guide rail is also slidably coupled to the motion generator and is arranged generally perpendicular to the first guide rail. A second magnetic actuator is associated with the second guide rail and magnetically coupled to the array of MEMS cantilever devices. The second magnetic actuator linearly moves the array of MEMS cantilever devices up to 10 cm in a second direction relative to the data storage medium. The second direction is perpendicular to the first direction and in a plane parallel to the data storage medium. Further, the first and second guide rails are arranged to independently move the array of MEMS cantilever devices in the first and second direction simultaneously.

A MEMS based storage system is also provided having a plurality of the storage modules. A drive is coupled to each of the plurality of storage modules. The drive has a power supply circuit and a control circuit.

A MEMS based storage system is also provided wherein the array of MEMS cantilever devices is positioned on an angle relative to the first direction. The angle of the array is approximately 1/n where n equals the number of the MEMS cantilever devices in a row of said array. Further, the data tracks are separated by a distance approximately D/n where D is the row period of the MEMS array.

A MEMS based storage system is also provided having a plurality of sub-band data tracks in the data storage medium. Each of the MEMS cantilever devices is arranged to read, write and erase data in a single data track in a sub-band.

A MEMS based storage system is also provided having a hermetically sealed housing sized to fit in an archive tape storage system. The stationary data storage medium is arranged and positioned within the housing. The drive is also coupled to receive and transmit signals wirelessly from each of the CMOS devices associated with the plurality of storage modules.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments, together with advantages and features, by way of example with reference to the drawings.

DETAILED DESCRIPTION

Figure 1:
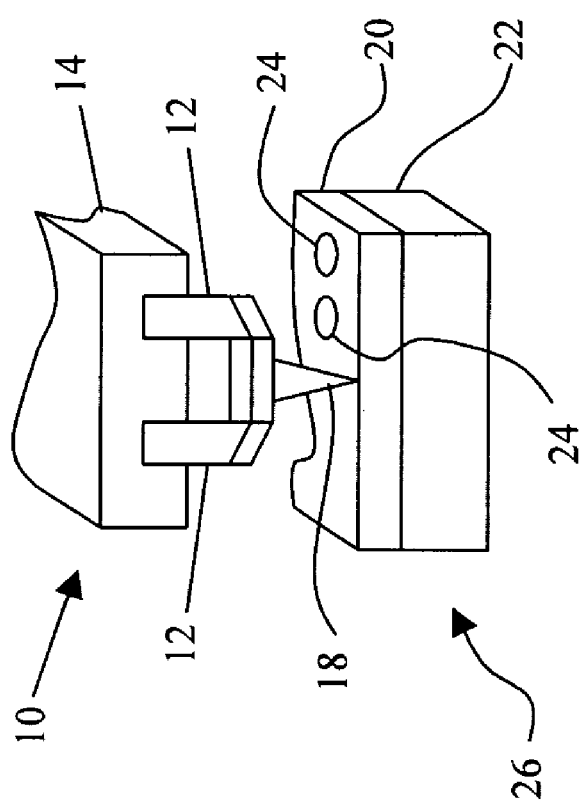
FIG. 1 is a schematic illustration of an exemplary embodiment micro-electromechanical system (MEMS) cantilever device used with data storage.
Figure 2:
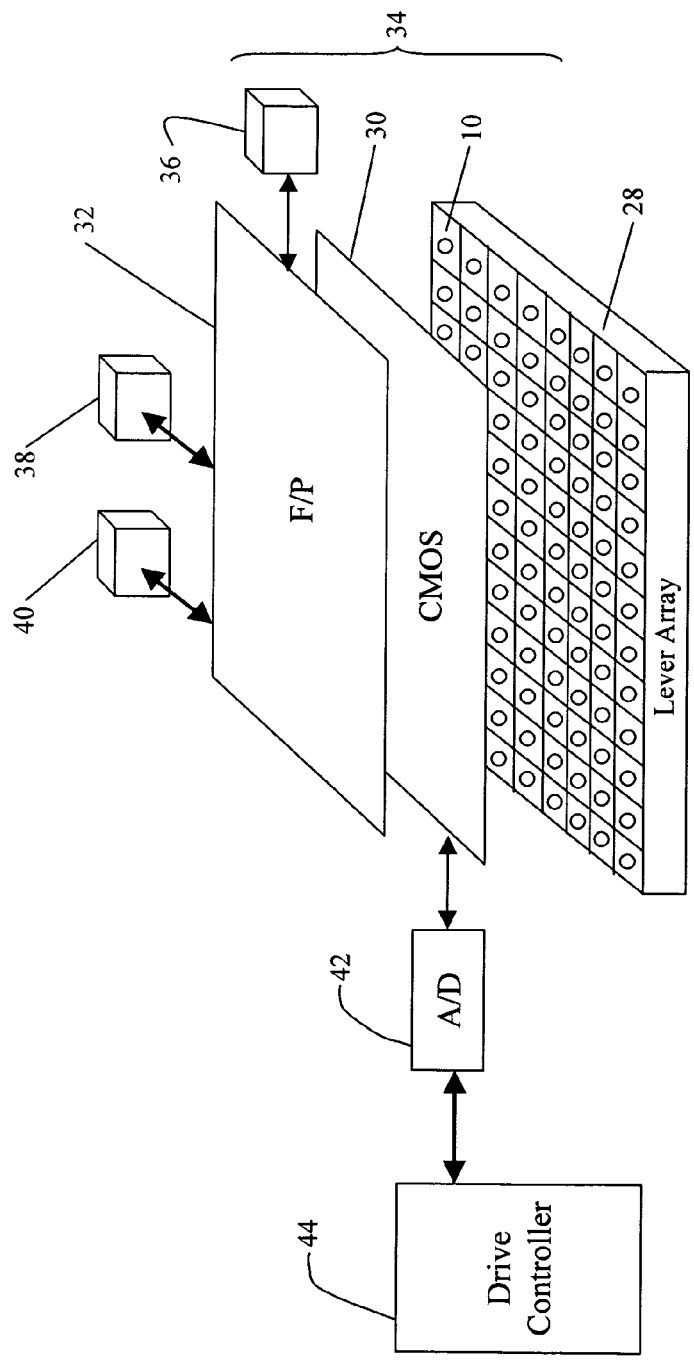
FIG. 2 illustrates a schematic representation of a MEMS based scanner arrangement for a data storage device having an array of the MEMS cantilever devices of FIG. 1.

Micro-electromechanical systems (MEMS) based storage systems that utilize a MEMS cantilever device are desirable due to their ability to store data at a high level of density, exceeding 1 terabit/in$^2$. An exemplary embodiment of such a system is shown in FIG. 1 and FIG. 2. The individual MEMS cantilever device 10 includes a pair of cantilever arms 12 that are supported by a structure 14. The arms 12 are connected by a heater 16 that is coupled to a probe tip 18. The arms 12 and heater 16 cooperate to form a current path during operation.

The probe tip 18 is arranged adjacent to a polymer layer 20 that is formed on a substrate 22. The polymer layer 20 and substrate 22 forms a stationary storage medium 26 that is used to store data in the storage system. During a write operation, the probe tip 18 is heated by passing current through the arms 12 and into the heater 16. The heat generated by heater 16 is conducted into the probe tip 18 to a temperature sufficient to form indents or pits 24 in the polymer layer 20. The pits 24 are then formed by moving the probe tip 18 into contact with the polymer layer 20. Typically, to form a pit 24, the heater 16 of the probe tip 18 is heated to a temperature of approximately 400° C. These pits 24 correspond to a data bit with a single pit 24 typically representing a logic "1", and the absence of a pit in a particular location being a logic "0".

The heater 16 and probe tip 18 are also a sensor for reading data from the storage medium 26. For data reading operation, current is passed through the arms 12 and into the heater 16, resulting in an increase in the temperature of the probe tip 18. The increase in temperature, unlike the write operations, is not sufficient to deform the polymer layer 20 to form a pit 24. The temperature of the heater 16 during read operations is typically on the order of about 200° C. It should be appreciated that the thermal conductance between the heater 16 and the polymer layer 20 varies depending on the distance between the heater 16 and polymer layer 20. During a read operation, the probe tip 18 is moved across the surface of polymer layer 20. When the probe tip 18 is moved into a region having a pit 24, the distance between the heater 16 and the polymer layer 20 changes resulting in a change in temperature. Since resistance is dependent on temperature, by monitoring the resistance of the heater 16 as the tip is placed adjacent a data location, the presence or lack of presence of a pit 24 may be determined. Thus the change in resistance is detected. The change in resistance represents information (a "1" or "0" bit). The data rate for a single MEMS device 10 is typically between 100 kbits/s to 1 Mbit/s.

By arranging the MEMS device 10 into an array of devices, a storage system having a high storage capacity may be achieved. Referring now to FIG. 2, an exemplary embodiment array 28 having MEMS devices 10 is illustrated. In the exemplary embodiment, the array 28 may have between 1000 and 10,000 MEMS devices 10. An array with 1000 MEMS devices would have an area of approximately 3 mm×3 mm. Time multiplexed electronics control the read/write/erase functions needed by the storage system to operate the MEMS device 10. In the embodiment illustrated in FIG. 2, the array 28 is assembled with an electronics circuit 30. In the exemplary embodiment, the circuit 30 is complementary metal-oxide semiconductor ("CMOS") based circuit having an area of about 12 mm×12 mm. The array 28 and CMOS circuit 30 are assembled on to a motion generator or scanner 32 to form a laminated MEMS scanner assembly 34. The scanner 32 is coupled to one or more actuators 36, 38, 40 that can move the circuit 30 and array 28 in the x, y, and z direction relative to the storage medium 26. In the exemplary embodiment, the scanner 32 provides movement over an area up to about 100 μm×100 μm to allow an accurate level of positioning control.

During operation, the circuit 30 reads the value of the resistance in the heater 16 and translates the value into an analog signal. The analog signal of the array 28 is multiplexed to an analog to digital ("A/D") converter 42. In the exemplary embodiment, there is one A/D converter 42 for each group of 64 MEMS devices 10. Where multiple A/D converters 42 are utilized, the signals from these converters 42 are further multiplexed in the digital domain (not shown). This allows the transmission of a single data stream to a drive controller 44. The transmission of the data from the MEMS scanner assembly 34 to the drive 44 may be performed using high bandwidth cabling, or, preferably through a short range wireless technology including but not limited to Bluetooth, 802.11 (WiFi), direct sequence-UWB, WiMedia Alliance and Multiband OFDM Alliance ("MBOA") UWB, wireless USB, IEEE 1394. In the exemplary embodiment, this arrangement is capable of transmitting an aggregate data rate between 800 MB/s to 1 GB/s. As will be discussed in more detail below, the drive 44 includes circuitry that aggregates and controls the flow of data from multiple MEMS arrays 28 that are associated with respective storage mediums to provide data from the storage system to the end user at a high data transfer rate. Drive 44 may further include power supply circuitry and controls for providing electrical power to MEMS arrays 28.

Figure 3:
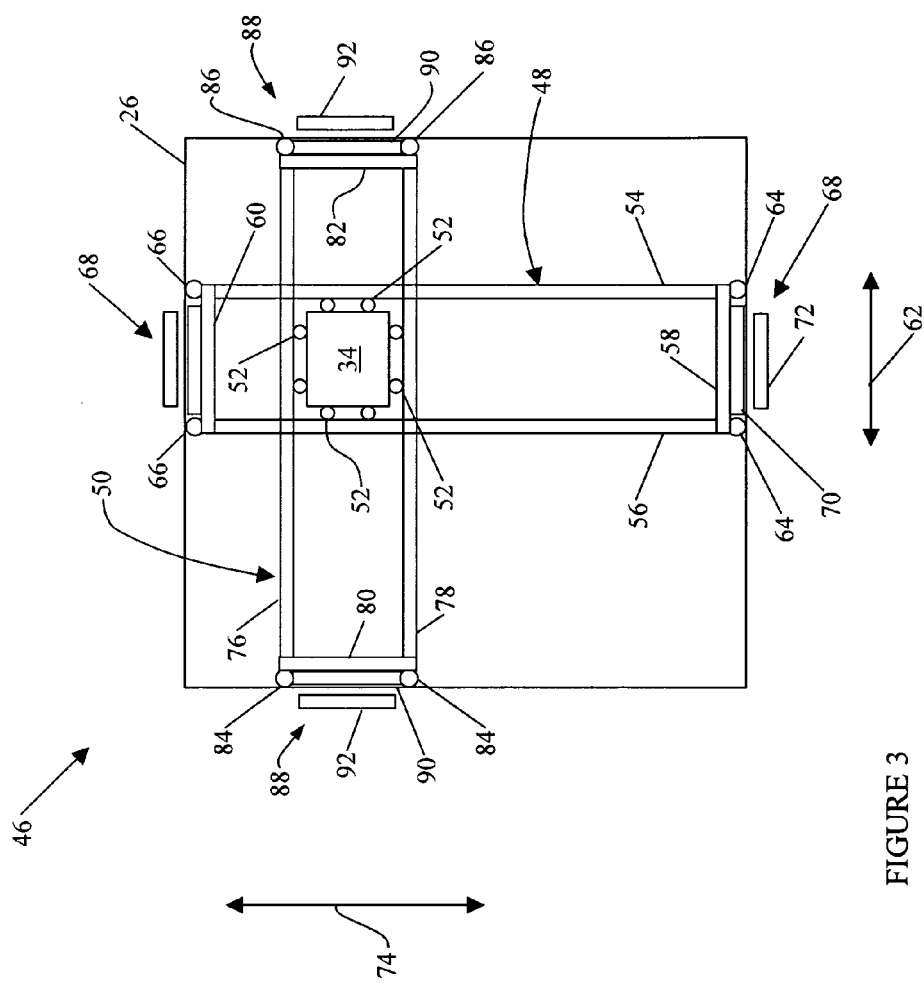
FIG. 3 illustrates a top plan view of an exemplary embodiment data storage module using the MEMS based scanner of FIG. 2.

The scanner 32 provides the fine positioning needed to quickly, accurately and repetitively read, write and erase date from the storage medium 26. However, to scale the amount of data stored on a storage medium 26, either additional MEMS scanner assemblies 34 would be needed, or the MEMS scanner assembly 34 would need to be moved over a larger range relative to the storage medium 26. An exemplary embodiment storage module 46 is illustrated in FIG. 3. In this embodiment, the MEMS scanner assembly is slidably mounted on first 48 and second 50 guide assemblies by a set of bearings 52.

The first guide assembly 48 includes a first and second guide rail 54, 56 that extend transversely across the surface of the storage medium 26. A pair of cross members 58, 60 connects the first and second guide rails 54, 56 at each end. Bearings 64, 66 are coupled to the cross members 58, 60 to allow the first guide assembly 48 to linearly slide relative to the storage medium 26 in a direction represented by arrow 62. The arrow 62 is generally perpendicular to the length of the first guide assembly 48. The bearings 64, 66 are supported by guides (not shown) that extend parallel to the edge of storage medium 26 (shown in FIG. 1) in the direction of arrow 62.

An actuator 68 is coupled to each cross member 58, 60. In the exemplary embodiment, the actuator 68 uses magnetic force transduction to cause the movement of the first guide assembly 48. In this embodiment, an armature 70 is mounted to each cross member 58, 60. The armature 70 interacts with a magnetic field generated by field member 72. As the field member 72 is moved in the direction of arrow 62, the first guide assembly is also moved under the influence of the magnetic field. As the first guide assembly 48 is moved, the MEMS scanner assembly 34 will also move in the same direction. The first guide assembly 48 allows the MEMS scanner assembly 34 ton travel the full length of the storage medium 26. In the exemplary embodiment, the storage medium is sized to fit within an storage cassette having dimensions of 10 cm×10 cm×2 cm. It should be appreciated that the use of a magnetic actuator 68 and wireless data transmission provides advantages in that the storage module 46 may be operated in hermetically sealed within a housing (not shown) having no openings or feed-through. Since the pits 24 in the polymer layer 20 are approximately 10 nm wide and 1 nm deep, the use of a hermetically sealed housing would aid in preventing contamination of the MEMS scanner assembly 34 and the storage medium 26.

The second guide assembly 50 is constructed in a similar manner to first guide assembly 48 except that the second guide assembly has a range of motion in the direction indicated by arrow 74. The second guide assembly 48 includes first and second rails 76, 78 that are connected at each end by cross members 80, 82. A pair of bearings 84, 86 is mounted to each cross member 80, 82 to allow the second guide assembly 50 to move linearly relative to the storage medium 26 in the direction indicated by arrow 74. The bearings are supported by guides (not shown) that extend parallel to the edge of storage medium 26 in the direction of arrow 74. A second pair of actuators 88 is coupled to cross members 80, 82. As discussed above, in the exemplary embodiment, the actuators 88 use magnetic force transduction to cause the movement of the second guide assembly 50. As the second guide assembly 50 is moved, the MEMS scanner assembly 34 will also move in the same direction. The second guide assembly 50 allows the MEMS scanner assembly 34 ton travel the full length of the storage medium 26. As discussed above, in the exemplary embodiment, the storage medium is sized to fit within an storage cassette having dimensions of 10 cm×10 cm×2 cm. The exemplary actuator 88 includes armatures 90 that are coupled to each cross member 80, 82 and field members 92 that are mounted adjacent to the armatures 90. A magnetic field generated by the field members 92 acts on the armatures 90 to cause movement of the second guide assembly 50.

By slidably coupling the MEMS scanner assembly 34 to the first and second guide assemblies 48, 50, the MEMS scanner assembly 34 may be positioned anywhere on the storage medium 26. Further, the first and second guide assemblies 48, 50 may simultaneously move the MEMS scanner assembly 34 independently from each other allowing the MEMS scanner assembly 34 to be quickly positioned in the location of the desired data. In operation, the guide assemblies translate the MEMS scanner assembly 34 to the desired location on the storage medium 26 and the scanner 32 uses actuators 36, 38, 40 to adjust the position of the MEMS array 28 to the location of the data with a high level of precision. Thus, the amount of data that may be stored is scalable by increasing the size of the storage medium 26 without increasing the number of scanner assemblies 34, which reduces manufacturing costs and the complexity of the system.

In operation, the data may be accessed from the storage medium in several ways. The first method involves using the guide assemblies 48, 50 to position the MEMS scanner assembly 34 in the general area of the desired data. Once the scanner assembly 34 is positioned, the scanner 32 can raster scan in the x and y directions to access the data.

Figure 4:
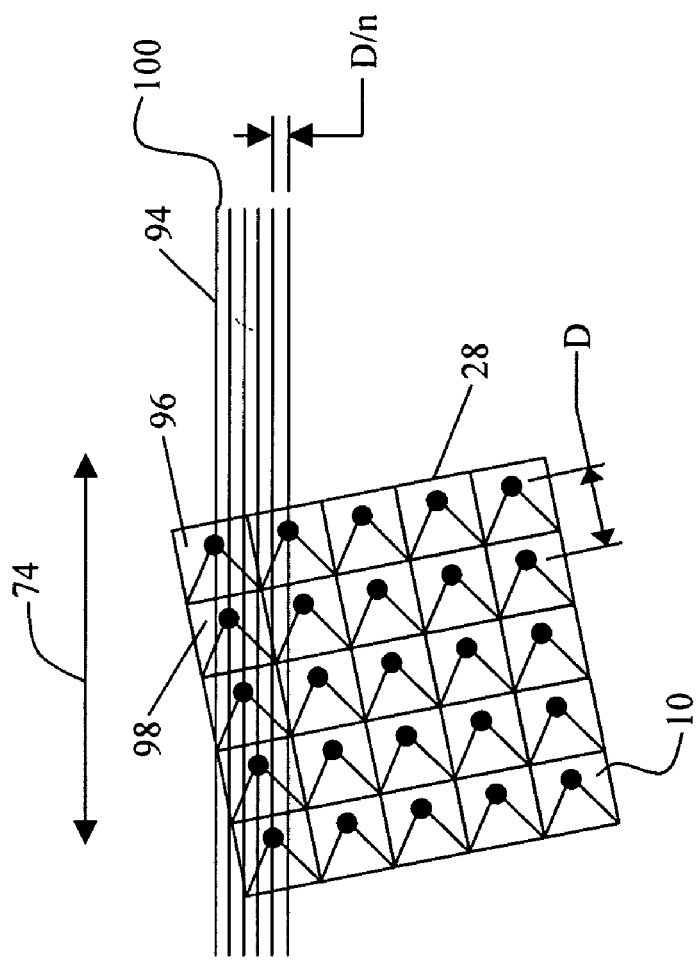
FIG. 4 is a schematic representation of an alternate embodiment array of MEMS cantilever devices arranged on an angle relative to the direction of travel.
Figure 5:
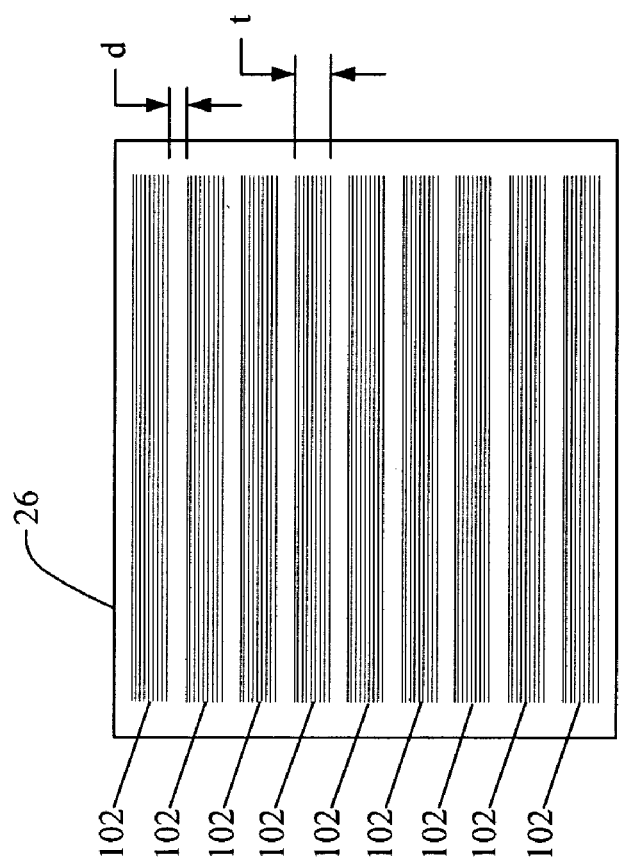
FIG. 5 is a plan view of a storage medium having a plurality of sub-bands formed by the array of MEMS cantilever devices of FIG. 4.

Alternatively, the scanner assembly 34 may be oriented on an angle relative to the direction of travel 74 as shown in FIG. 4. In this embodiment, the MEMS array 28 is rotated to an angle and the scanner assembly is moved longitudinally along the length of the guide assembly 48. As a result, each MEMS device 10 has a data track along the length of the row. For example, MEMS device 96 is oriented to align with line 94. Line 94 represents a line of data, e.g., pits 24, which is parallel to the direction of travel 74. If the angle is on the order of 1/n rad (angular units, 360 deg corresponding to 2 pi), where n denotes the number of cells in a row, the overlapping of data tracks may be avoided. Thus, only MEMS device 96 will read, write and erase data in track 94 and only MEMS device 98 will read write and erase data in track 100. This continues across the MEMS array 28 with each MEMS device having a unique data track. The data tracks are separated by a distance D/n where D is the row-period of the MEMS array (distance between two adjacent probe tips measured along the row direction, see FIG. 4). The area enclosed by two adjacent tracks forms a sub-band 102 as shown in FIG. 5 in which one MEMS device 96 for the sub-band enclosed by tracks 94, 100, can write multiple tracks of data without interfering with other MEMS devices. In the exemplary embodiment, D=100 µm and n=32, the sub-band 102 has a width "t" of approximately 2.5 µm. Further, a grace distance "d" of approximately 0.5 µm separates each sub-band.

The alternate embodiment illustrated in FIGS. 4 and 5 provides additional advantages. Since the data is arranged in linear rows or data tracks, the guide assembly 48 may move the scanner assembly 34 along the track to acquire data rather than merely positioning the scanner assembly 34 on a gross or coarse level. This reduces the requirements and need for the scanner 32. While the embodiment may eliminate the need for an actuator, e.g., actuator 36, in the direction of travel, it is expected that some amount of fine adjustment may be needed to calibrate the positioning of the scanner assembly 34 and correct errors in the positioning by the guide assemblies 48, 50.

Figure 6:
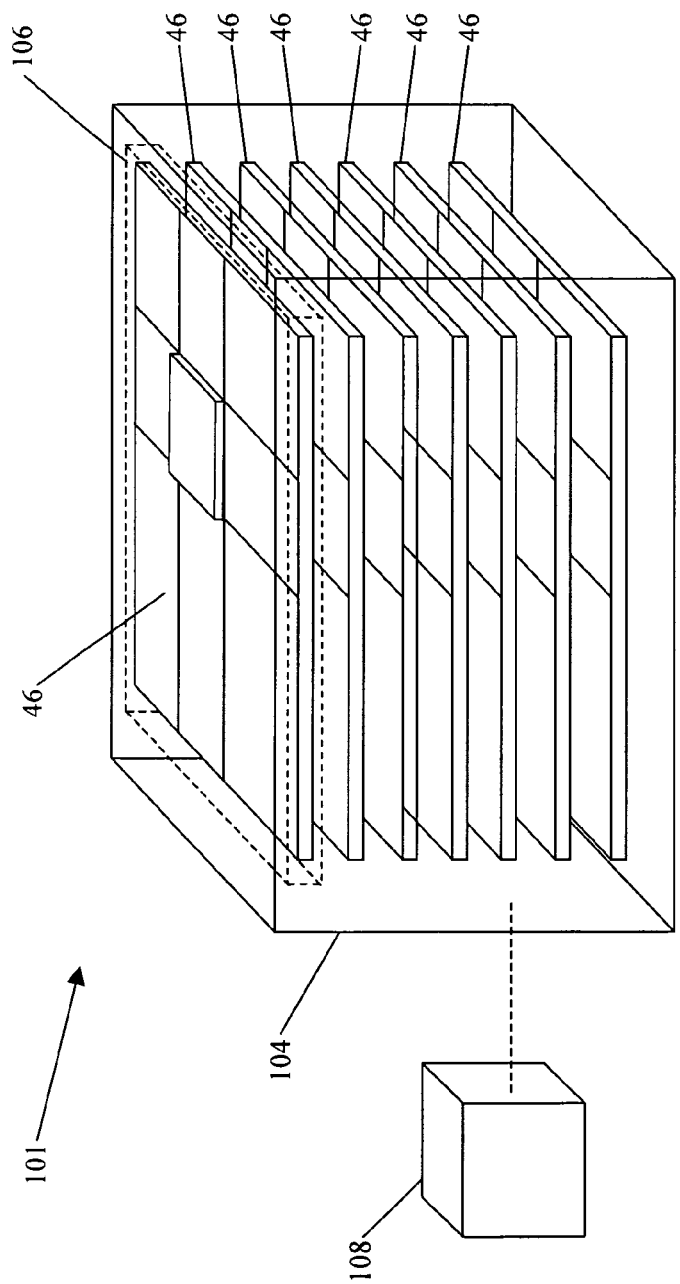
FIG. 6 is a perspective view illustration of data storage system having a plurality of the data storage devices of FIG. 3.

Referring now to FIG. 6, a storage system 101 utilizing multiple storage modules 46 are shown. In this embodiment, the storage modules 46 are positioned in stacked arrangement within a housing 104. In the exemplary embodiment, there are 7 storage modules 46 arranged within the housing 104, which is sized to fit and be compatible with existing archival storage cartridge ("ASC") systems. An ASC will generally have a dimension of about 10 cm×10 cm×2 cm. A sealed housing 106 may protect each the individual storage modules 46. The housing 106 maintains the interior environment to keep contaminants from the storage medium and MEMS scanner assembly. The use of individually packaged storage modules 46 provides an advantage in that if a single storage module needs repair or maintenance, it may be removed without disrupting the operation of the other modules. Alternatively, the housing 106 may be eliminated and the housing 104 may be hermetically sealed to protect the internal components. This would allow a decrease in manufacturing labor, material and assembly costs. Further, the storage system 101 may also be arranged as a redundant array of independent disks (commonly referred to as "RAID") where data is divided and replicated among the multiple storage modules to increase data reliability and performance.

As discussed above, each of the storage modules 46 are coupled to a drive circuitry 108. The drive 108 may be located internal to the housing 104 or alternatively external to the housing. In another embodiment, the housing 14 is sized and configured to be received in an archival cartridge storage system. This provides additional advantages in that it allows the storage system 101 to used in existing data storage systems. It is also contemplated that the drive 108 may be incorporated into the archival system to allow further increases in scalability while decreasing manufacturing costs.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A micro-electromechanical system (MEMS) based data storage system comprising a storage module, where said storage module includes:

a stationary data storage medium;

an array of MEMS cantilever devices, each of said MEMS cantilever devices having an associated tip wherein said array of MEMS cantilevers devices is arranged adjacent to a data surface;

a CMOS device coupled to said array, said CMOS device having circuits arranged to receive signals from said MEMS cantilever devices;

a motion generator coupled to said CMOS device, said motion generator operable over an area of 100 µm×100 µm;

a first guide rail slidably coupled to said motion generator;

a first magnetic actuator associated with said first guide rail and magnetically coupled to said motion generator to linearly move said motion generator up to 10 cm in a first direction relative to said data storage medium;

a second guide rail slidably coupled to said motion generator, said second guide rail being arranged generally perpendicular to said first guide rail;

a second magnetic actuator associated with said second guide rail and magnetically coupled to said array of MEMS cantilever devices to linearly move said array of MEMS cantilever devices up to 10 cm in a second direction relative to said data storage medium wherein said second direction is perpendicular to said first direction and in a plane parallel to said data storage medium; wherein said first and second guide rails are arranged to independently move said array of MEMS cantilever devices in said first and second direction simultaneously.

2. The MEMS based storage system of claim 1 further comprising:
   a plurality of said storage modules; and,
   a drive coupled to each of the plurality of storage modules, said drive having a power supply circuit and a control circuit.

3. The MEMS based storage system of claim 2 wherein said array of MEMS cantilever devices is positioned on an angle relative to said first direction, wherein said angle is approximately 1/n where n equals the number of said MEMS cantilever devices in a row of said array, and wherein said data tracks are separated by a distance approximately D/n where D is the row period of the said MEMS array.

4. The MEMS based storage system of claim 3 further comprising:
   a plurality of sub-band data tracks in said data storage medium; and,
   wherein each of said MEMS cantilever devices reads, writes and erases data in a single data track in a sub-band.

5. The MEMS based storage system of claim 4 further comprising:
   a hermetically sealed housing sized to fit in an archive tape storage system, wherein said stationary data storage medium is positioned within said housing; and,
   wherein said drive is coupled to receive and transmit signals wirelessly from each of said CMOS devices associated with said plurality of storage modules.

* * * * *